United States Patent [19]
Baker et al.

[11] Patent Number: 5,069,686
[45] Date of Patent: Dec. 3, 1991

[54] PROCESS FOR REDUCING EMISSIONS FROM INDUSTRIAL STERILIZERS

[75] Inventors: Richard W. Baker, Palo Alto; Johannes G. Wijmans, Menlo Park, both of Calif.

[73] Assignee: Membrane Technology & Research, Inc., Menlo Park, Calif.

[21] Appl. No.: 564,030

[22] Filed: Aug. 7, 1990

[51] Int. Cl.$^5$ ............................................. B01D 53/22
[52] U.S. Cl. .......................................... 55/16; 55/71; 55/74; 55/84
[58] Field of Search .................. 55/16, 68, 71, 74, 158

[56] References Cited

U.S. PATENT DOCUMENTS

| | | | |
|---|---|---|---|
| 3,838,553 | 10/1974 | Doherty | 55/66 X |
| 4,119,417 | 10/1978 | Heki et al. | 55/16 X |
| 4,435,191 | 3/1984 | Graham | 55/16 |
| 4,553,983 | 11/1985 | Baker | 55/16 |
| 4,717,407 | 1/1988 | Choe et al. | 55/158 X |
| 4,857,078 | 8/1989 | Watler | 55/16 |
| 4,906,256 | 3/1990 | Baker et al. | 55/16 |
| 4,931,070 | 6/1990 | Prasad | 55/16 |
| 4,934,148 | 6/1990 | Prasad et al. | 55/16 X |
| 4,941,893 | 7/1990 | Hsieh et al. | 55/16 |
| 4,963,165 | 10/1990 | Blume et al. | 55/16 |

*Primary Examiner*—Robert Spitzer
*Attorney, Agent, or Firm*—J. Farrant

[57] ABSTRACT

A process for treating gas streams containing a sterilant gas and a diluent gas, such as sterilizer exhaust streams. The process involves a sterilant removal step and a diluent removal step. The sterilant removal step can be absorption, catalytic oxidation or some other chemical reaction. The diluent removal step includes a membrane separation step, and may include a condensation step. The permselective membranes used for the membrane separation step are typically selective for the diluent gas over other gases in the stream. The process removes essentially all the sterilant present in the feed stream, and typically removes 90% or more of the diluent. The process is particularly useful for treating ethylene oxide/CFC-12 mixtures.

36 Claims, 11 Drawing Sheets

PROCESS FOR REDUCING EMISSIONS FROM INDUSTRIAL STERILIZERS

FIELD OF THE INVENTION

The invention relates to a process for treating emissions from industrial sterilizers. More particularly, the invention concerns the treatment o emission streams, containing both a sterilizing agent and a diluent, by means of a process including at least one membrane separation step.

BACKGROUND OF THE INVENTION

Various chemical sterilizing agents, including chlorine dioxide, hydrogen peroxide and olefin oxides, such as ethylene oxide, are known. These sterilizing agents are used in the preparation of pharmaceutical and food products, in packaging, in manufacture of spices and in medical applications, for example. Chemical sterilants may be used in concentrated form, or may be diluted with an inert diluent, such as nitrogen, carbon dioxide or a chlorofluorocarbon. For example, dichlorodifluoromethane (CFC-12) has been widely used as a diluent for ethylene oxide, to maintain the ethylene oxide concentration in a sterilant gas mixture below the explosive threshold.

Ethylene oxide is highly toxic, and strict procedures must be followed in sterilization operations that use ethylene oxide, in quarantine of materials sterilized by exposure to ethylene oxide, and in disposal of exhaust gases from the sterilization operation. Several technologies for handling sterilizer off gases are available, including scrubbing, incineration, catalytic oxidation and other chemical reactions. U.S. Pat. No. 4,812,292 to L. Joslyn describes a scrubbing process in which an alkoxide sterilant gas is absorbed into an aqueous stream in a multistage absorption process. U.S. Pat. No. 4,828,810 to R. J. Kruse et al. describes a reaction process in which ethylene oxide in dilute concentrations is treated by exposure to a cation-exchange resin. Conventionally, the waste gas that is left after the sterilant has been removed to a safe level is vented to the atmosphere. However, scientific evidence linking CFCs and similar compounds to depletion of the ozone layer has made it imperative that they be removed from effluent streams. The United States and many other nations have signed an agreement entitled the "Montreal Protocol on Substances that Deplete the Ozone Layer". The Montreal Protocol calls for progressive production freezes on the following chemicals: CFC-11 ($CCl_3F$), CFC-12 ($CCl_2F_2$), CFC-113 ($C_2Cl_3F_3$), CFC-114 ($C_2Cl_2F_4$), CFC-115 ($C_2ClF_5$), Halon-1211 ($CF_2ClBr$), Halon-1301 ($CF_3Br$) and Halon-2402 ($C_2F_4Br_2$). It is planned to reduce the production of CFCs to 50% of the 1986 levels in the next decade.

The sterilization industry is, therefore, faced with the need to find alternative sterilization procedures, to find alternative sterilant mixtures that do not contain CFCs, or to find alternative sterilizer exhaust treatment methods that reduce or eliminate atmospheric CFC emissions.

Alternative sterilization procedures include heat sterilization and radiation sterilization, both of which have been adopted in some situations. However, many pharmaceutical, food or medical products cannot withstand heat or radiation sterilization. At least as far as irradiation is concerned, public opinion may deprecate products that have been subject to irradiation, and FDA registration requirements may delay or preclude adoption.

Changing to sterilant mixtures that do not contain CFC diluents is not straightforward. Ethylene oxide forms potentially explosive mixtures with air over the range 3–100 vol % ethylene oxide. Pure ethylene oxide can be used as a sterilant, but demands explosion-proof equipment, stringent storage and handling precautions and brings other attendant problems. Even if nitrogen is used as a blanketing medium for the sterilization operation, equipment must be built and operated to withstand explosion. Ethylene oxide can be diluted with nitrogen or carbon dioxide, but to be non-flammable, the mixture must contain below 10 vol % ethylene oxide. Use of such dilute mixtures necessitates basic redesign of process equipment and operation cycles, and may again raise issues of compliance with FDA, OSHA, ASTM or other standards.

Limited attempts have been made to develop exhaust treatment methods that control diluent emissions. U.S. Pat. No. 4,831,196 to A. J. Buonicore et al. describes an exhaust gas treatment method aimed at first removing the olefin oxide sterilant from the exhaust gas, then subjecting the remaining exhaust gas to a compression-condensation operation to remove a portion of the inert diluent, before discharge to the atmosphere. Under the compression-condensation conditions described in the patent, it appears to be possible to recover about 60–80% of CFC-12, for example, in this way. Thus 20–40% of the inert gas used in the sterilant mixture is still emitted to the atmosphere. Applicants believe that no method to reduce atmospheric emissions below about 15% is presently available to the art.

SUMMARY OF THE INVENTION

The invention is a new process for treating gas mixtures containing a sterilizing agent and an inert diluent. The new process includes a membrane separation step for removal of the diluent. Using this process, it is possible to capture 85%, 90% or more of the diluent gas present in the sterilant mixture. Thus atmospheric emissions are reduced fourfold, eightfold or more compared with the best previously available control technology.

The process of the invention includes two separation operations. In the first operation, waste gas containing sterilant and inert diluent is subjected to a treatment to remove the sterilant. The waste gas thus treated may be off-gas from the sterilizer, effluent gas from quarantine chambers, work, storage or transfer areas, or any other situation where such a gas mixture arises. The first treatment operation may be any process known in the art for sterilant removal, including absorption and reaction methods, such as aqueous scrubbing, catalytic oxidation, exposure to solid or liquid reagents or adsorption onto activated carbon. The residue gas stream from the first treatment operation will normally be essentially free of the sterilant, or will contain it in very low concentrations only. The residue gas stream is then passed to a second treatment operation to remove the diluent. This operation comprises a membrane separation process. The process may involve running the gas stream containing the inert diluent across a membrane that is selectively permeable to the diluent. The diluent is concentrated in the stream permeating the membrane; the residue non-permeating stream is depleted in diluent. Alternatively, the membrane may be selective for air or other components in the gas over the diluent.

In either case, the driving force for permeation across the membrane is preferably the pressure difference between the feed and permeate sides. To achieve a high flux of the permeating components, the permselective membrane should be made as thin as possible. A preferred embodiment of the invention involves the use of a composite membrane comprising a microporous support, onto which the permselective layer is deposited as a thin coating. The preparation of such membranes is known in the art, and is discussed in detail below.

The membrane configuration is not critical to the invention. In a preferred embodiment, the membranes are cast and coated as flat sheets, and then rolled into spiral-wound modules. However, other types of configuration, such as hollow fibers, plate-and-frame, or flat sheet membranes are also possible and are intended to be within the scope of the invention. Hollow-fiber membranes would be well suited to embodiments in which the membrane separation step uses glassy membranes to preferentially permeate air, for example.

The flux of a gas or vapor through a polymer membrane is proportional to the pressure difference of that gas or vapor across the membrane. To achieve high fluxes of the permeating components, it is desirable not only to make the permselective membrane very thin, but also to operate the system with a substantial pressure drop across the membrane. The pressure drop may be achieved by drawing a vacuum on the permeate side of the membrane, by pressurizing the feed, or both.

The efficiency of the process, in terms of the relative proportions of diluent and other gases in the feed, permeate and residue streams, will be determined by a number of factors, including the pressure difference, the selectivity of the membrane, the proportion of the feed that permeates the membrane, and the membrane thickness. The present invention can be used for gas streams ranging in diluent concentration from dilute to concentrated. Eighty to 99% removal of the diluent content of the feed to the membrane separation step can typically be achieved with one-step or two-step membrane systems, leaving a residue stream containing only traces of diluent. In cases where the diluent is a CFC, for example, the process would have a very beneficial environmental impact, in that CFC emissions from sterilant mixtures could be essentially eliminated.

Basic embodiments of the invention involve a two-operation sterilant mixture treatment process, one operation being used primarily to remove sterilant gas from the mixture, the other being the membrane process used primarily to remove diluent gas from the mixture.

The sterilant removal operation and the diluent removal operation may each be made up of a single or multiple treatment steps. Thus the sterilant removal operation might involve an absorption step followed by a reaction step. The diluent removal operation may be a membrane separation step alone, or the membrane separation step may be combined with another diluent removal or recovery process such as condensation or carbon adsorption. The membrane separation step itself may be configured in many possible ways, and may include a single membrane stage, an array of multiple stages or steps, or combinations of these.

The process of the invention may be used in situations where no diluent removal or recovery has previously been practised, or may be used to improve existing diluent removal or recovery technology.

It is an object of the invention to provide a process for treating sterilant gas mixtures to separate the sterilant gas from the diluent gas.

It is an object of the invention to provide a process for removing or recovering diluent gas from sterilant gas mixtures.

It is an object of the invention to provide a process for removing diluent gas present in a sterilant gas mixture before that gas mixture is discharged to the atmosphere.

It is an object of the invention to reduce fluorinated hydrocarbon emissions to the atmosphere.

Other objects and advantages of the invention will be apparent from the description of the invention to those of ordinary skill in the art.

It is to be understood that the above summary and the following detailed description are intended to explain and illustrate the invention without restricting its scope.

DETAILED DESCRIPTION OF THE INVENTION

Figure 1:
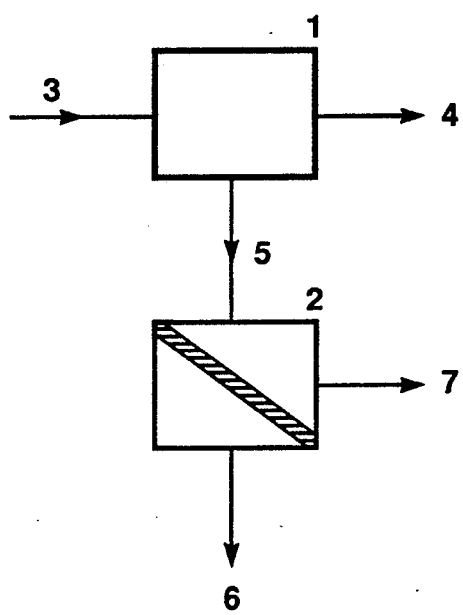
FIG. 1 is a conceptual representation of the process of the invention.

The term vapor as used herein refers to organic compounds in the gaseous phase below their critical temperatures.

The term fluorinated hydrocarbon as used herein refers to fully or partially substituted hydrocarbons wherein at least one fluorine atom is substituted for a hydrogen atom.

The term CFC as used herein refers to fluorinated hydrocarbons containing at least one fluorine atom and one chlorine atom.

The term HCFC as used herein refers to fluorinated hydrocarbons containing at least one fluorine atom, one chlorine atom and one hydrogen atom.

The term permselective as used herein refers to polymers, or membranes made from those polymers, that exhibit selective permeation for at least one gas or vapor in a mixture over the other components of the mixture, enabling a measure of separation between the components to be achieved.

The term multilayer as used herein means comprising a support membrane and one or more coating layers.

The term selectivity as used herein means the ratio of the permeabilities of gases or vapors as measured with mixed gas or vapor samples under the normal operating conditions of the membrane.

The term residue stream means that portion of the feedstream that does not pass through the membrane.

The term permeate stream means that portion of the feedstream that passes through the membrane.

The term membrane unit as used herein means one or more membrane modules arranged in parallel, so that a portion of the incoming gas stream passes through each one.

The term multistep is used for an arrangement of membrane modules or units connected together such that the residue stream from one module or unit becomes the feedstream for the next.

The term multistage is used for an arrangement of membrane modules or units connected together such that the permeate stream from one module or unit becomes the feedstream for the next.

The term membrane array means a set of one or more individual membrane modules or membrane units connected in any arrangement, including multistep, multistage or combinations of these.

In the process of the present invention, a gas stream containing a sterilant gas and a diluent gas is treated to remove the sterilant gas and the diluent gas separately. The gas streams to be treated include, but are not limited to, exhaust gases generated when a sterilization chamber is evacuated; gases withdrawn from areas used to store sterilized products; gases withdrawn from areas used to store or transfer sterilant gas mixtures; other work areas where sterilant gas mixtures or residues may be present and the like.

The process of the invention is particularly useful as part of an industrial sterilizer cycle. Sterilization is often carried out in a sealed chamber in which the articles to be treated are exposed to a sterilant/diluent gas mixture. When sterilization is complete, the chamber must be purged before it can be opened and the articles removed. Purging is typically carried out by repeated cycles of evacuation/flushing with air/evacuation. For example, the chamber may be pumped out by means of a vacuum pump down to a pressure of about 0.3 atm. Air is then introduced and the resulting gas mixture is again evacuated. This process is repeated up to six times or more, until the chamber atmosphere is essentially free of sterilant gas. At this point the chamber can be opened. The gas mixtures that are withdrawn from successive flushing/evacuation cycles contain progressively lower concentrations of sterilant and diluent. Any or all of these gas mixtures may be subjected to the treatment process of the invention.

The process of the invention is shown conceptually in FIG. 1. Referring now to this figure, box 1 represents the sterilant removal operation; box 2 represents the diluent removal operation. Incoming gas stream, 3, contains a mixture of sterilant gas and diluent gas, with nitrogen, air or other gases. The sterilant removal operation removes all or most of the sterilant gas, which may be withdrawn as stream, 4, for further treatment or destruction if necessary. Gas stream, 5, containing diluent and other gases, passes to the diluent removal operation, which comprises a membrane separation step. The diluent removal step separates gas stream, 5, into two streams, 6 and 7, one of which is highly concentrated in diluent, the other of which is highly depleted in diluent, compared with stream, 5. The diluent-depleted stream may be discharged to the atmosphere or recycled within the process, for example. The diluent-concentrated stream may be liquified, recycled, or sent for reprocessing, for example.

The Sterilant Removal Operation

The sterilant removal operation may simply involve removing the sterilant gas from the gas mixture. Typically, however, the operation will both remove the sterilant gas from the gas mixture and convert it to a non-toxic or environmentally safer material. Representative, but non-limiting, sterilant removal processes include:

(a) Scrubbing

In this process, sterilant gas mixture, alone or combined with air, blanketing gas or other gases is contacted with an aqueous liquid in any conventional scrubbing arrangement that offers acceptable gas-liquid contact, such as a plate column, a packed tower, or the like. For ethylene oxide treatment, the liquid is typically a mixture of water and sulfuric or other acid. The acid catalyzes the reaction of ethylene oxide with water to form ethylene glycol. The acid liquid is recirculated to the scrubber and the concentration of ethylene glycol in the liquid builds up over time. After a period of months or years, or when the ethylene glycol concentration exceeds a chosen limit, such as 40% or 70%, the scrubbing liquid is neutralized and discarded. The absorption and the reaction processes may both take place in the scrubber, or a separate reactor may be used to render the individual absorption and reaction steps more efficient. The use of scrubbers is well known in the art and is taught, for instance, in U.S. Pat. Nos. 2,135,271; 4,112,054 and 4,831,196, all incorporated herein by reference in their entirety.

(b) Catalytic Oxidation

Olefin oxide sterilants can be oxidized in the presence of a catalyst to form carbon dioxide and water. In a representative process, the low-temperature oxidation of ethylene oxide is performed in the presence of a solid catalyst, such as Hopcalite. The gas stream to be treated is heated to about 330° F.; reaction of ethylene oxide with oxygen produces carbon dioxide and water. Heat given off by the reaction can be used to heat the incoming gas.

(c) Other Chemical Reactions

Representative processes exemplifying other chemical reaction methods known to the art are those that involve reaction of ethylene oxide with an ion-exchange resin. For example, recent U.S. Pat. No. 4,828,810 describes a process in which contaminated air is passed through a bed packed with a solid, acid-form, cation-exchange resin. The ethylene oxide reacts with the agents in the bed at the solid-gas interface and is permanently bound to it. The reaction takes place at room temperature and essentially complete ethylene oxide capture is achieved. The bed must be replaced periodically when the solid reagent is exhausted.

(d) Condensation

Sterilant gas may also be removed by cooling or compressing and cooling. The fraction of sterilant removed depends on the temperature and pressure used. Depending on the diluent, a fraction of the diluent may also be condensed. In this case, the condensed mixture from the sterilant removal operation may be mixed with the diluent recovered in the diluent removal operation and the mixture may be reblended or processed for further use.

The Diluent Removal Operation

The diluent removal operation involves membrane separation, alone or in conjunction with another process.

The Membrane Separation Step

The membrane separation step uses a permselective membrane to separate the diluent from air or other gases. Many types of membrane are suitable for use in the membrane separation process. For example, the membrane may take the form of a homogeneous membrane, an asymmetric membrane, a multilayer composite membrane, a membrane incorporating a gel or liquid layer, or dispersed particulates, or any other form known in the art.

The most preferred embodiments of the invention employ a multilayer membrane. This has two discrete layers, a microporous support, which provides mechanical strength, and a permselective coating, which is responsible for the separation properties. The microporous support membrane should preferably have a flow resistance that is very small compared to the permselective layer. A good support membrane is an asymmetric Loeb-Sourirajan type membrane, which consists of a relatively open, porous substrate with a thin, dense, finely porous skin layer. Preferably the pores in the skin layer should be less than 1 micron in diameter, to enable it to be coated with a defect-free permselective layer. The support membrane should resist the solvents used in applying the permselective layer. Polymers that may be used to form the microporous support membrane include polysulfone, polyimide, polyvinylidene fluoride, polyamide, polypropylene or polytetrafluoroethylene. The membranes may be prepared by the processes for making finely microporous or asymmetric membranes known in the art. Commercial ultrafiltration membranes, for example, NTU ® 4220 (crosslinked polyimide), or NTU ® 3050 (polysulfone) from Nitto Electric Industrial Company, Osaka, Japan, are also suitable as supports.

Optionally, the support membrane may be reinforced by casting it on a web. The multilayer membrane then comprises the web, the microporous membrane, and the permselective membrane. The web material may be made from polyester or the like.

To maximize the flux of permeating components, the permselective layer should be made very thin. However, the permselective layer must also be free of pinholes or other defects that could destroy the selectivity of the membrane by permitting bulk flow-through of gases. The permselective coating may be directly in contact with the microporous support. Optionally, sealing or protective layers above or below the permselective layer may be included in the membrane structure.

The preferred method of depositing the permselective layer is by dip coating. The dip-coating method is described, for example, in U.S. Pat. No. 4,243,701 to Riley et al., incorporated herein by reference. For example, a support membrane from a feed roll is passed through a coating station, then to a drying oven, and is then wound onto a product roll. The coating station may be a tank containing a dilute polymer or prepolymer solution, in which a coating, typically 50 to 100 microns thick, is deposited on the support. Assuming a 1% concentration of polymer in the solution, then after evaporation, a film 0.5 to 1 micron thick is left on the support.

Alternatively, the permselective membrane may be cast by spreading a thin film of the polymer solution on the surface of a water bath. After evaporation of the solvent, the permselective layer may be picked up onto the microporous support. This method is more difficult in practice, but may be useful if the desired support is attacked by the solvent used to dissolve the permselective material.

The thickness of the permselective layer should preferably be less than about 20 microns, more preferably 10 microns or less, most preferably 5 microns or less.

The form in which the membranes are used in the invention is not critical. They may be used, for example, as flat sheets or discs, hollow fibers, or spiral-wound modules, all forms that are known in the art. Spiral-wound modules are a preferred choice. References that teach the preparation of spiral-wound modules are S. S. Kremen, "Technology and Engineering of ROGA Spiral Wound Reverse Osmosis Membrane Modules", in *Reverse Osmosis and Synthetic Membranes*, S. Sourirajan (Ed.), National Research Council of Canada, Ottawa, 1977; and U.S. Pat. No. 4,553,983, column 10, lines 40–60. Alternatively the membranes may be configured as asymmetric or multilayer hollow fibers and then potted into a module.

The choice of the permselective material will depend on the separation to be performed. To remove an organic vapor diluent, such as a CFC, a rubbery polymer could be used. Examples include nitrile rubber, neoprene, silicone rubbers, including polydimethylsiloxane, chlorosulfonated polyethylene, polysilicone-carbonate copolymers, fluoroelastomers, plasticized polyvinylchloride, polyurethane, cis-polybutadiene, cis-polyisoprene, poly(butene-1), polystyrenebutadiene copolymers, styrene/butadiene/styrene block copolymers and styrene/ethylene/butylene block copolymers. Particularly preferred rubbers are silicone rubbers. Thermoplastic polyolefin elastomers and block copolymers of polyethers and polyesters would also be useful.

If carbon dioxide has been used as the diluent, suitable permselective polymers for separating carbon dioxide from nitrogen, for example, would include rubbery materials, such as those mentioned above, or glassy materials such as polyphenylene oxide, polymethylpentene or substituted polyacetylenes, such as polytrimethylsilylpropyne. Particularly preferred membranes for carbon dioxide/nitrogen separation are those made from polyamide-polyether block copolymers, such as those having the formula:

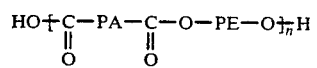

where PA is a polyamide segment, PE is a polyether segment, and n is a positive integer. Such polymers have both high selectivity and high flux for carbon dioxide.

For separating diluent nitrogen from oxygen, air or other mixtures, glassy polymers could be used. Suitable polymers include, for example, polysulfone, polyethersulfone, polyimides, polycarbonates, polyestercarbonates, brominated polyestercarbonates, cellulose derivatives such as cellulose diacetate, cellulose triacetate, cellulose nitrate and ethylcellulose; polyvinyl chloride, polyvinylidene fluoride, polyacrylate, polyphenylene oxide, polymethylpenetene and polystyrene.

Embodiments of the invention that use membranes selectively impermeable to the diluent are also possible. In this case, membranes made from glassy polymers, such as those represented above, could be used to separate nitrogen or air from an organic diluent, for example.

The membrane separation process is preferably a pressure-driven process, wherein the permeants cross the membrane under a gradient provided by a partial pressure difference for each permeant between the feed and permeate sides. The pressure drop across the membrane can be achieved by pressurizing the feed, by evacuating the permeate or by both. Because the volume of the permeate stream is much less than the volume of the feed, it is generally preferable to operate in the vacuum mode, that is to draw a partial vacuum on the permeate side, rather than to compress the whole of the feed gas stream to high pressure. However, in embodiments of the invention where the feed gas stream is at high pressure, because of having passed through a compression-condensation step, for example, it may be possible to utilize the high pressure of the feed and dispense with the permeate vacuum pump.

A number of factors have an effect on the performance of the membrane process, including the selectivity of the membrane, the ratio of the feed and permeate pressures, and the ratio of the permeate and feed flows.

The permselective membranes used in the present invention should preferably have a selectivity for the faster permeating component of at least 5, more preferably at least 10, and most preferably at least 20.

The pressure ratio, $\phi$, is defined as the ratio total feed pressure/total permeate pressure. The diluent partial pressure on the permeate side of the membrane must never exceed the diluent partial pressure on the feed side, or the permeation process would stop. Thus, even for an infinitely selective membrane, the permeate diluent concentration can never be greater than $\phi$ times the feed concentration. From a practical point of view, however, it is hard to maintain either extremely high feed pressure or a hard permeate vacuum. Therefore, a practical pressure ratio will normally be no more than 200, more preferably no more than 100, and most preferably no more than about 50. To acheive a useful separation, the lower limit on the pressure ratio should preferably be not less than about 5, more preferably not less than 7, and most preferably not less than 10.

The stage cut is defined as the ratio of the total permeate flow to the total feed flow. The stage cut is important when the diluent concentration in the feed gas to the membrane system is low, such as below 20%. Suppose that a stream contains 10% diluent and it is desired to reduce the concentration to 0.5%. If only the diluent permeated the membrane, then the permeate flow would be pure diluent, and would be 9.5% of the total feed flow. Thus, the minimum stage cut to achieve this degree of separation would be 9.5%. In practice, the stage cut will always be higher than this, because the other gases in the feed will also permeate the membrane to some extent. However, for the process to be efficient when handling low-concentration feeds, the stage cut should preferably be kept low, such as below 40%.

The membrane separation step can be carried out using membrane system designs tailored to particular requirements in terms of percentage of diluent removed from the feed to the membrane system, or the degree of concentration of the permeate. Some non-limiting representative system designs are shown schematically in FIGS. 2-4. The systems have been shown with both a feed compressor and a permeate vacuum pump. One or the other alone will often suffice to achieve an adequate transmembrane driving force. Alternatively, slight feed compression combined with a modest permeate vacuum may be used.

Figure 2:
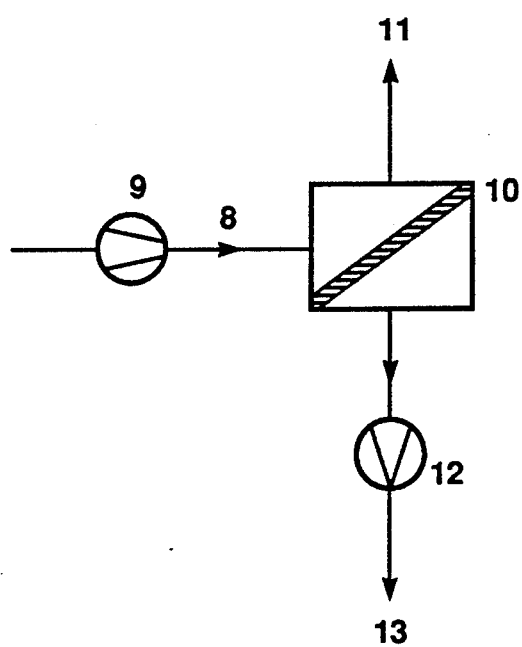
FIG. 2 is a schematic drawing of a single-stage membrane separation step.

The simplest system is a single-stage unit, of which a representative example is shown schematically in FIG. 2. Referring now to this figure, the system comprises feed gas compressor, 9, membrane unit containing one or more membrane modules, 10, and permeate vacuum pump, 12. The feed gas stream, 8, passes through the membrane modules and is discharged as treated stream, 11. Diluent-concentrated stream, 13, is withdrawn from the permeate side of the membrane through the vacuum pump. A single-stage membrane separation system such as this is generally able to remove at least 80% of the diluent from the feed gas stream. This degree of separation may be adequate for many applications.

Figure 3:
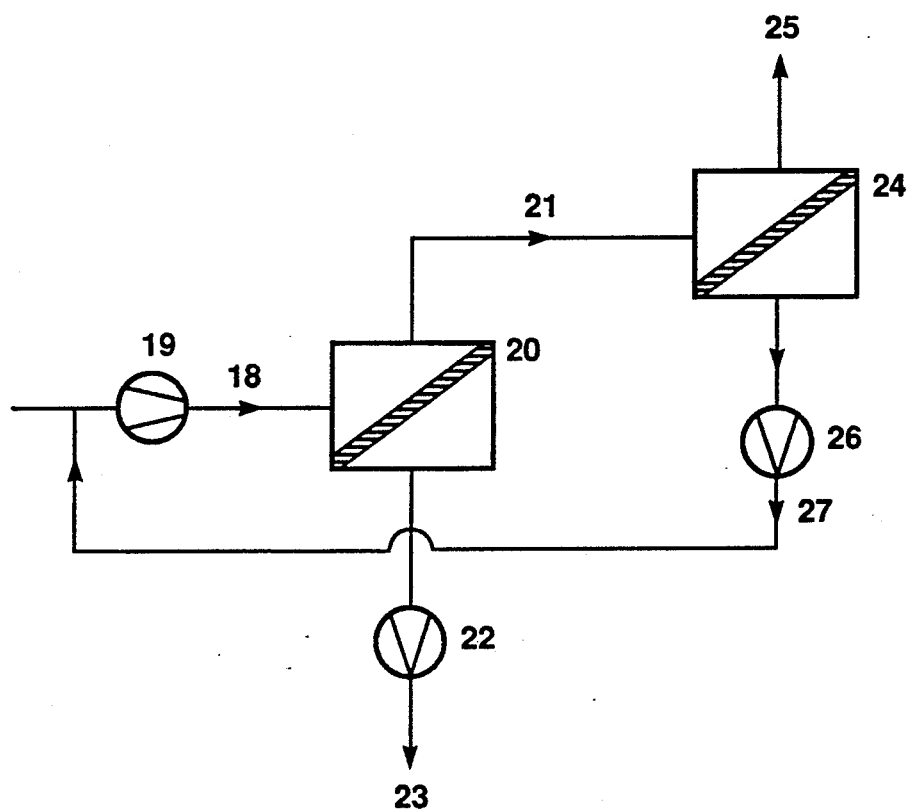
FIG. 3 is a schematic drawing of a two-step membrane separation step.

A multistep system design may be preferred when a very high degree of removal of diluent from the feedstream is required, such as 95% or more. FIG. 3 shows such a two-step system. Referring now to this figure, gas stream, 18, passes through compressor, 19, and thence to a first-step membrane unit, 20. The residue stream 21, is fed to the second-step membrane unit, 24. The treated stream, 25, is discharged or recycled. Vacuum pump, 22, is used on the permeate side of the first-step membrane unit to withdraw the diluent-concentrated permeate, 23, from the first membrane step. The permeate stream, 27, from the second-step membrane unit is recycled via vacuum pump, 26, to be combined with the incoming feedstream.

Figure 4:
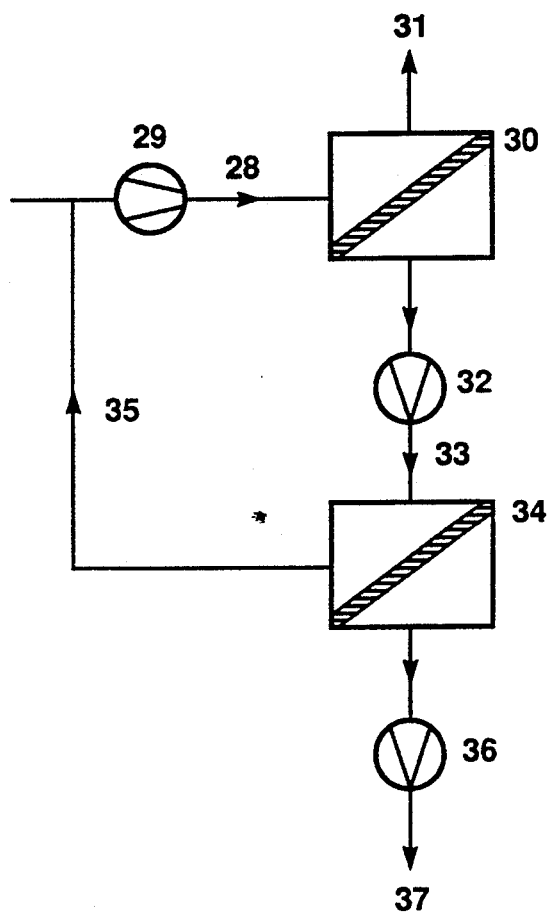
FIG. 4 is a schematic drawing of a two-stage membrane separation step.

In some applications, although 80-90% diluent removal from the feed gas is adequate, further concentration is required to make efficient diluent recovery from the permeate possible. This may be the case, for example, if the incoming gas stream contains a low concentration of diluent. A two-stage system, as shown in FIG. 4, may then be used. Referring now to FIG. 4, the the feed gas stream, 28, passes through a compressor, 29, and thence to a first stage membrane unit, 30. The treated stream 31, is discharged or recycled. A vacuum pump, 32, is used on the permeate side of the membrane unit, and the permeating vapor stream, 33, is drawn through the vacuum pump and passed at close to atmospheric pressure to second membrane unit, 34. The permeate from this unit, 37, is withdrawn through vacuum pump, 36. The residue stream 35, from the second membrane unit is combined with the incoming gas stream, 28. This configuration allows diluent enrichments of 50- to 100-fold to be achieved in the permeate. Because the feedstream to the second stage is very much smaller than the feed to the first, the second stage is normally only 10-20% as large as the first stage.

Figure 5:
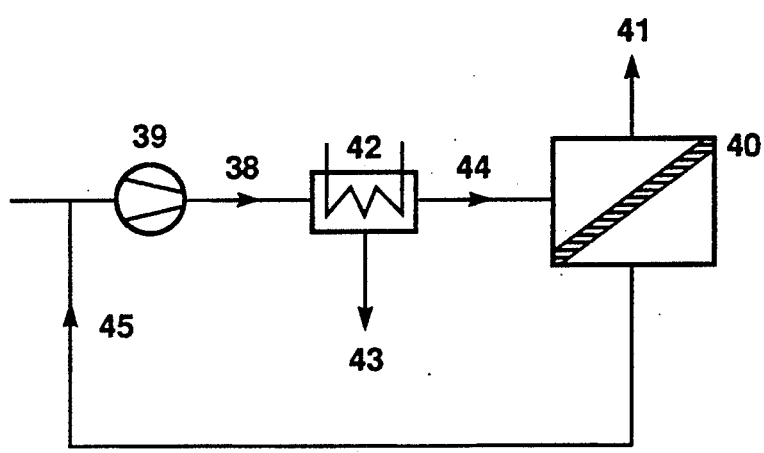
FIG. 5 is a schematic drawing of a diluent removal operation including a condensation step and a membrane separation step.

The membrane separation step may optionally be combined with another method of diluent removal. FIG. 5 shows a representative diluent removal operation, in which the gas stream from the sterilant removal operation is first compressed and chilled to condense a fraction of the diluent, then passed to a membrane separation step. Referring now to FIG. 5, feed gas stream, 38, passes through a compressor, 39, and thence to chiller, 42, where a stream of liquid diluent, 43, is formed. The non-condensed stream, 44, becomes the feed for membrane unit, 40. The permeate from this unit, 45, is returned and mixed with incoming gas stream, 38. The residue stream, 41, from the membrane unit is discharged.

Embodiments of the invention that use both condensation and membrane separation processes for the diluent removal operation are preferred for the removal of condensable diluents. The two processes are synergistic, in that the energy demand to carry them out in tandem is substantially less than would be needed were they to be performed separately. A process that combines the two individual treatment methods can, therefore, utilize the advantages of each one to create an optimized process that achieves better results, at higher efficiency, than could be gotten from either method alone.

A particular advantage of the process of the invention relates to the driving forces for the individual condensation and membrane separation processes. Condensation is frequently facilitated by at least a moderate degree of compression of the gas stream. Compression of the gas stream to be treated also facilitates the membrane separation step. If the feed to the membrane system is at high pressure compared to atmospheric, this may completely obviate the need for a vacuum pump or other means of lowering the pressure on the permeate side.

The Condensation Step

The condensation step may involve chilling, compression or a combination of these. The goal of the condensation step is to bring the gas stream to the dewpoint of the diluent, so that a portion of the diluent will condense out of the gas stream in liquid form. The amount of diluent that can be removed from the gas stream in this way will depend on its boiling point, feed concentration and the operating conditions under which the condensation is performed.

The gas stream to be treated by the condensation step should preferably contain above about 10-20% diluent. Preferably the gas stream will pass first through a compressor, where it is pressurized to a pressure in the range 1-15 atmospheres. Compression above about 15 atmospheres, and particularly above 20 atmospheres, is less desirable, because of the energy demands and consequent high cost. After compression, the gas is cooled in a chiller. The chiller may be water cooled, or may employ refrigerants that can take the gas down to lower temperatures. If the diluent concentration in the incoming gas stream is high, and its boiling point is relatively high, then chilling without compression may be adequate to recover the bulk of the diluent. Where practical, it is preferable to maintain the chiller temperature no lower than 0° C., to avoid ice formation, because many streams to be treated will contain water vapor. If the diluent has a low boiling point, such as CFC-12, this may not be possible, because the diluent recovery from the condensation step would be very low.

The diluent concentration remaining in the vent gas after the condensation step depends on the vapor/liquid equilibrium at the operating conditions under which the condensation step is performed. In practise, the economics of achieving extremely high pressures and extremely low temperatures will limit the performance of the condensation step. It is preferable that the condensation step be designed to remove at least 50%, more preferably at least 70%, of the diluent present in the incoming gas. Operation under extreme conditions to achieve greater than 90% diluent removal is usually unnecessary, because of the presence of the membrane step. If the condensation step necessitates cooling to below 0° C., and the gas stream contains water vapor, then optionally the condensation step may use two chillers in series. The first chiller is maintained at a temperature close to 0° C., and removes most of the entrained water. The second chiller is maintained at the lower temperature necessary to remove a substantial fraction of the diluent. Some water vapor will inevitably pass into the second chiller, but the use of the first chiller will significantly reduce the need for defrosting the second. Alternatively, the condensation step may include another type of dehydration process through which the gas stream passes before it enters the chiller.

The overall degree of diluent removal that can be achieved will depend on the combined effects of the condensation step and the membrane separation step. For example, suppose the condensation step removes 50% of the diluent in the feed gas. If the condensation step is followed by a membrane separation step that can remove 80% of the diluent reaching it, then the total removal obtained by the process is 90%. If the condensation step removes 80%, and is followed by a membrane separation step that also removes 80%, then the total removal obtained by the process is 96%. If the condensation step removes 80% and the membrane separation step 90%, the total removal is 98%.

The above discussion is intended to show that the process can be tailored to achieve a desired degree of diluent removal in the most efficient manner. The tailoring can be done by comparing estimates of the energy and dollar costs with several sets of system configurations and operating conditions. For example, the costs and energy requirements to achieve 95% total removal, using an initial condensation step removing 50, 75 or 90% of the condensable component, followed by a membrane separation step removing 90, 80 or 50% of the remaining condensable component, could be compared.

Many different embodiments of the process are possible. The condensation step may be followed by the membrane separation step, or vice versa. If the diluent concentration in the gas stream is above about 20-50%, then it is normally preferable to subject the incoming gas stream first to the condensation step and then to the membrane separation step, as shown in FIG. 5. If the diluent concentration in the gas stream is below about 10-20%, then it is generally preferable to subject the incoming gas stream first to the membrane separation step and then to the condensation step. The condensation step may use one or more compressors and chillers. The membrane step may use any array of membranes, including single-stage, mutistage, multistep, or combinations of these.

Figure 6:
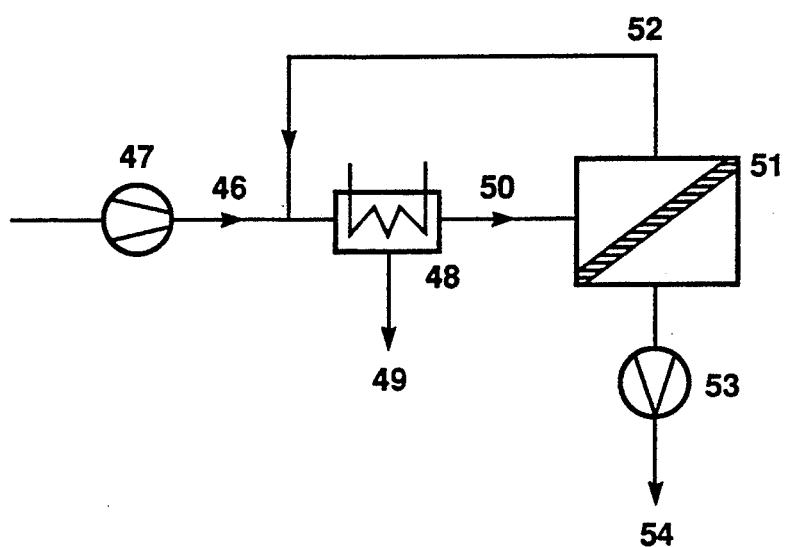
FIG. 6 is a schematic drawing of a diluent removal operation including a condensation step and a membrane separation step, in which the membrane is selective for nitrogen or air over diluent.

All of the embodiments above were described in terms of membranes that are selectively permeable to the diluent component of the gas stream. Embodiments in which the membranes used are selectively permeable to air or other gases present in the stream, and are relatively impermeable to the diluent, are also possible. If such membranes are used, the residue stream will be diluent-enriched; the permeate stream will be diluent-depleted. Such membranes could be used, for example, in cases where the diluent concentration in the feed to the membrane system is very high, such as greater than 60%. If diluent-selective membranes were used, a substantial portion of the feed gas would have to permeate the membrane in order to remove a significant fraction of diluent from the feed. The large permeate stream thus created would have to be recompressed, leading to increased energy requirements. Membranes highly selective for nitrogen, air or other non-condensable components could remove a substantial fraction of the non-condensables. Because the residue gas remains at approximately the same pressure as the feed, the residue could be fed directly back into the stream entering the chiller, without the need for recompression. FIG. 6 shows such an embodiment. Referring now to this figure, the incoming gas stream, 46, is passed through compressor, 47, to chiller, 48, to yield liquid diluent stream, 49. The non-condensed fraction, 50, of the gas stream passes to membrane separation unit, 51, which contains membranes selectively permeable to the non-condensable component. The non-permeating, residue stream, 52, is thus diluent-enriched and can be returned to the chiller without recompression. A pressure difference across the membrane is provided by optional vacuum pump, 53. The permeate stream, 54, is diluent-depleted and can be discharged or recycled. As with the diluent-selective embodiments, the condensation step and the membrane separation step may both contain single or multiple units, and the condensation step may precede the membrane separation step or vice versa.

The process of the invention may also be carried out by using two discrete membrane separation steps, between which the condensation step is performed. Process designs of this type enable different membrane materials to be used in the two membrane separation steps. Also the membrane area used in the two steps, and hence the gas processing capacity, can be different.

Whatever the configuration of the diluent removal operation, the gas stream that is discharged should contain no more than 15% of the diluent present in the feed, preferably no more than 10% and most preferably no more than 5%.

The invention is now further illustrated by the following examples, which are intended to demonstrate the process of the invention, but are not intended to limit the scope or underlying principles of the invention in any way.

EXAMPLES

The example are in three groups. The first group illustrates the capability of membranes to separate diluent gases from air, nitrogen or other gases. The second group compares various possible system designs for the diluent removal operation. The third group takes a specific sterilant gas mixture and shows typical treatment operations and performance that could be achieved in accordance with the invention.

EXAMPLES 1-8: MEMBRANE PERMEATION EXPERIMENTS

EXAMPLE 1: Carbon Dioxide Separation from Air or Nitrogen

An anisotropic microporous support membrane was cast using the Loeb-Sourirajan technique. A casting solution of 17.5 wt % Udel ® P3500 polysulfone (Union Carbide) in 82.5 wt % dimethylformamide was prepared. This was cast on a non-woven polyester web at a casting speed of 3.5 m/min and casting thickness of 178 microns. The resulting membranes were precipitated in water, washed for 24 hours, and dried in an oven at 80°-100° C.

One gram of Pebax grade 4033 (Atochem Inc.) was dissolved in 99 g butanol-1 by stirring the solution for 2 days at 80° C. The resulting 1% Pebax solution was hand coated onto the polysulfone support by wicking at 50° C. Two coats of Pebax solution were applied. The permeation properties of the resulting membranes are summarized in Table 1 below.

TABLE 1

| | Permeation Properties of Polyamide-Polyether/Polysulfone Composite Membranes. Pebax ® 4033. | | | | | |
|---|---|---|---|---|---|---|
| Coating | $P/1N_2$ | $P/1O_2$ | $P/1CO_2$ | $\alpha O_2/N_2$ | $\alpha CO/N_2$ | $\alpha CO_2/O_2$ |
| | ($cm^3$(STP)/$cm^2 \cdot s \cdot cm$ Hg) | | | | | |
| 2 × 1 Pebax ® 4033 in butanol-1 | $3.0 \times 10^{-6}$ | $9.3 \times 10^{-6}$ | $9.8 \times 10^{-5}$ | 3.1 | 33 | 11 |

Example 2: Separation of air from CFC-11 using a glassy membrane

Asymmetric membranes were prepared from poly(ethersulfone) using the casting technique as described for Example 1. A thin film of silicone rubber was added on top of the skin layer to seal any open pores or defects. The permeability data for the poly(ethersulfone) membrane are shown in Table 2.

TABLE 2

| Permeation Properties of Poly(ethersulfone) Asymmetric Membranes | | | | | |
|---|---|---|---|---|---|
| Feed Composition | | Permeation Rate $\left( \dfrac{cm^3(STP)}{cm^2 \cdot s \cdot cmHg} \right)$ | Permeate Composition | | |
| Oxygen (%) | CFC-11 (ppm) | | Oxygen (%) | CFC-11 (ppm) | $O_2$/CFC-11 Selectivity |
| 24 | 252 | $9.45 \times 10^{-7}$ | 66 | 8.7 | 120 |

Example 3: Separation of air from CFC-11 using a glassy membrane

Asymmetric membranes were prepared from poly(phenylene oxide) using the casting technique as described for Example 1. A thin film of silicone rubber was added on top of the skin layer to seal any open pores or defects. The permeability data for the poly(phenylene oxide) membranes are shown in Table 3.

TABLE 3

Permeation Properties of Poly(phenylene oxide) Asymmetric Membranes

| Feed Composition | | Permeation Rate $\left(\dfrac{cm^3(STP)}{cm^2 \cdot s \cdot cmHg}\right)$ | Permeate Composition | | $O_2$/CFC-11 Selectivity |
|---|---|---|---|---|---|
| Oxygen (%) | CFC-11 (ppm) | | Oxygen (%) | CFC-11 (ppm) | |
| 24 | 448 | $4.73 \times 10^{-7}$ | 51 | 4 | 330 |

64.7 psia and a temperature of 22° C. The results are summarized in Table 4.

TABLE 4

Permeation of Nitrogen and CFC-12 through Silicone Rubber Composite Membranes at 22° C.

| Concentration (vol %) | | | | Feed pressure (psia) | Permeate pressure (psia) | $J_{N_2}$ cm/cm$^2 \cdot$ s $\cdot$ cm Hg | α CFC-12/$N_2$ |
|---|---|---|---|---|---|---|---|
| Feed | | Permeate | | | | | |
| $N_2$ | CFC-12 | $N_2$ | CFC-12 | | | | |
| 98.15 | 1.85 | 94.1 | 5.9 | 64.7 | 1.2 | $7.63 \times 10^{-5}$ | 9.4 |
| 94.3 | 5.7 | 79.3 | 20.7 | 64.7 | 3.7 | $7.47 \times 10^{-5}$ | 19.9 |
| 88.1 | 11.9 | 64.3 | 35.3 | 64.7 | 7.7 | $8.02 \times 10^{-5}$ | 10.3 |
| 68.8 | 31.2 | 26.8 | 73.2 | 64.7 | 20.2 | $8.48 \times 10^{-5}$ | 11.8 |
| 95.8 | 4.2 | 87.1 | 12.9 | 64.7 | 2.7 | $7.76 \times 10^{-5}$ | 8.9 |

Example 4: Separation of CFC-12 from nitrogen or air at 22° C.

An anisotropic microporous support membrane was cast using the Loeb-Sourirajan technique, as in Example 1. The casting solution was 17.5 wt % Udel® P3500 polysulfone in 82.5 wt % dimethylformamide, the casting speed of the machine was 3.5 m/min and the casting thickness was 178 microns. The membranes were cast onto a polyester web, precipitated in water, washed for 24 hours, and dried in an oven at 80°-100° C. A multilayer membrane was made by dip-coating a solution of silicone rubber prepolymer onto the microporous support. The coated membrane passed through a drying oven, and was wound up on a product roll. The thickness of the finished silicone rubber permselective layer was 3.5 μm.

The selectivity of the multilayer membrane was determined by measuring the fluxes of nitrogen/CFC-12 mixtures through the membrane at a feed pressure of 64.7 psia and a temperature of 22° C. The results are summarized in Table 4.

Example 5: Separation of CFC-12 from nitrogen or air at 0° C.

A permselective membrane was prepared and tested as in Example 4, but at a temperature of 0° C. The results are summarized in Table 5.

TABLE 5

Permeation of Nitrogen and CFC-12 through Silicone Rubber Composite Membranes at 22° C.

| Concentration (vol %) | | | | Feed pressure (psia) | Permeate pressure (psia) | $J_{N_2}$ cm/cm$^2 \cdot$ s $\cdot$ cm Hg | α CFC-12/$N_2$ |
|---|---|---|---|---|---|---|---|
| Feed | | Permeate | | | | | |
| $N_2$ | CFC-12 | $N_2$ | CFC-12 | | | | |
| 97.1 | 2.9 | 93.2 | 6.8 | 64.7 | 1.9 | $5.64 \times 10^{-5}$ | 4.1 |
| 98.4 | 1.6 | 94.4 | 5.6 | 64.7 | 1.0 | $5.80 \times 10^{-5}$ | 12.5 |
| 81.9 | 18.1 | 42.6 | 57.4 | 64.7 | 11.7 | $6.54 \times 10^{-5}$ | 19.3 |
| 89.7 | 10.3 | 65.6 | 34.4 | 64.7 | 6.7 | $5.87 \times 10^{-5}$ | 15.8 |
| 96.2 | 3.8 | 87.3 | 12.7 | 64.7 | 2.5 | $5.38 \times 10^{-5}$ | 12.2 |
| 75.2 | 24.8 | 28.7 | 71.3 | 64.7 | 16.0 | $7.11 \times 10^{-5}$ | 19.8 |

Example 6: Separation of CFC-12 from Nitrogen or Air at −20° C.

A permselective membrane was prepared and tested as in Example 4, but at a temperature of −20° C. The results are summarized in Table 6.

TABLE 6

Permeation of Nitrogen and CFC-12 through Silicone Rubber Composite Membranes at −20 C.

| Concentration (vol %) | | | | Feed pressure (psia) | Permeate pressure (psia) | $J_{N_2}$ cm/cm$^2 \cdot$ s $\cdot$ cm Hg | α CFC-12/$N_2$ |
|---|---|---|---|---|---|---|---|
| Feed | | Permeate | | | | | |
| $N_2$ | CFC-12 | $N_2$ | CFC-12 | | | | |
| 74.4 | 25.6 | 21.6 | 78.4 | 64.7 | 16.6 | $7.70 \times 10^{-5}$ | 32.3 |
| 89.6 | 10.4 | 61.9 | 38.1 | 64.7 | 6.7 | $4.76 \times 10^{-5}$ | 26.7 |
| 97.3 | 2.7 | 90.5 | 9.5 | 64.7 | 1.7 | $3.57 \times 10^{-5}$ | 14.9 |
| 98.6 | 1.4 | 94.9 | 5.1 | 64.7 | 0.9 | $3.53 \times 10^{-5}$ | 17.2 |

Example 7: CFC-11 Separation from Nitrogen

Figure 7:
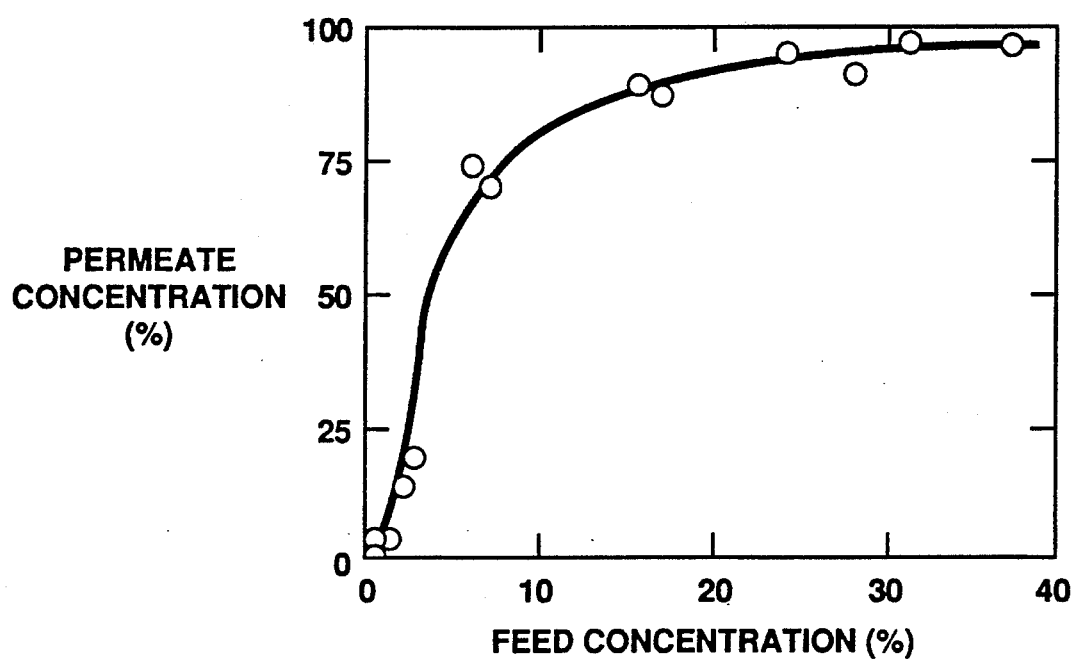
FIG. 7 is a graph showing the relationship between feed and permeate concentrations of CFC-11 at CFC feed concentrations up to about 35 vol %.

Sample feedstreams containing 1-35 vol % CFC-11 in nitrogen were evaluated in a laboratory test system containing one membrane module. The module contained a multilayer membrane with a permselective silicone rubber layer and a membrane area of approximately 2,000 cm$^2$. The experiment was carried out at room temperature (22° C.). The feed pressure was 50 psig. The feed and residue CFC concentrations were determined by withdrawing samples by syringe and then subjecting these to gas chromatograph (GC) analysis. A small bypass stream was used to take the samples at atmospheric pressure. Two liquid nitrogen traps were used to condense the solvent contained in the permeate stream. The permeate concentration as a function of the feed concentration is plotted in FIG. 7. The calculated CFC-11/$N_2$ selectivity of the module increased from 30 at 1 vol % to 50 at 35 vol %.

Example 8: HCFC-123 Separation from Nitrogen

Figure 8:
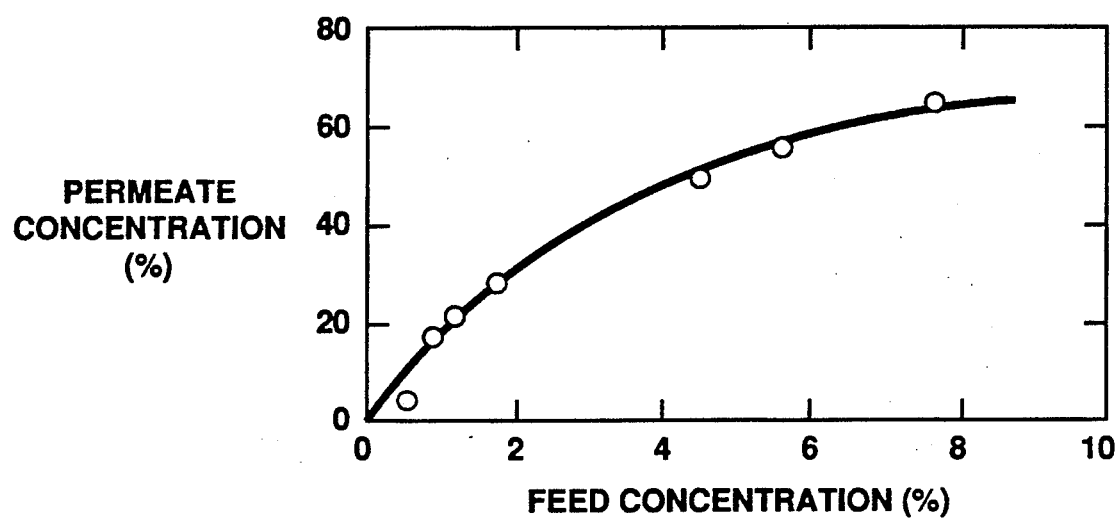
FIG. 8 is a graph showing the relationship between feed and permeate concentrations of HCFC-123 at CFC feed concentrations up to about 8 vol %.

The experimental procedures described in Example 7 were carried out using a feedstream containing HCFC-123 ($C_2HCl_2F_3$) in nitrogen in concentrations from 0.5–8 vol %. The permeate concentration as a function of the feed concentration is plotted in FIG. 8. The calculated HCFC-123/$N_2$ selectivity of the module remained constant at about 25 over the feed concentration range.

Example 9-15: COMPARISION OF DILUENT REMOVAL OPERATIONS

This set of examples compares treatment of gas streams containing CFC-12 by condensation alone and by diluent removal operations in accordance with invention. The stream is assumed to have a flow rate of 100 scfm and to contain 50% CFC-12 in all cases. The membrane calculations are all based on CFC-12 selectivities determined in single-module experiments of the type described in the first group of examples. The calculations were performed using a computer program based on the gas permeation equations for cross flow conditions described by Shindo et al., "Calculation Methods for Multicomponent Gas Separation by Permeation," *Sep. Sci. Technol.* 20, 445–459 (1985). The membrane area required was generated by the computer program.

Example 9: Compression to 10 Atmospheres (No chilling. No membrane separation step. Not in accordance with the invention).

The CFC-12 laden stream is compressed to 10 atmospheres, then passed through a condenser at room temperature. This raises the total pressure of the gas stream to 165 psia, so that the partial pressure of the CFC-12 is 83 psia. The saturated vapor pressure of CFC-12 at 22° C. and 10 atmospheres is 88 psia. Therefore no removal of CFC-12 from the gas stream could be achieved under these conditions.

Example 10: Compression to 10 Atmospheres, plus Membrane Separation

The performance of a process as shown in FIG. 5, involving a condensation step as in Example 9, followed by a membrane separation step, was calculated. In the condensation step, the CFC-12 laden stream is compressed to 10 atmospheres, but not chilled. The non-condensed fraction from the condensation step is subjected to a membrane separation step, using a membrane with a selectivity for CFC-12 over nitrogen of 10. A pressure drop across the membrane is provided only by the elevated pressure of the compressed feed. The permeate stream from the membrane separation step is returned for recompression. The performance is characterized as shown in Table 8.

TABLE 8

| Stream | Composition | Flow rate |
|---|---|---|
| Calculated Performance of Diluent Removal Operation as in FIG. 5 | | |
| CONDENSATION STEP: | | |
| Feed | 50% CFC-12 in input + 72.4% returned from membrane step = 63.0% | 100 scfm + 105 scfm returned from membrane step = 205 scfm |
| Liquid condensate | Pure CFC-12 | 7.3 kg/min |
| Condenser off-gas | 50% CFC-12 | 158 scfm |
| MEMBRANE SEPARATION STEP: | | |
| Feed | 50% CFC-12 | 158 scfm |
| Residue | 5.0% CFC-12 | 53 scfm |
| Permeate | 72.4% CFC-12 | 105 scfm |

Membrane area: 28 m$^2$
Fractional recovery of CFC from feed: 95%

Comparing this example with Example 7, it may be seen that 95% CFC-12 recovery is now possible, using only the driving force provided by compression of the feed.

Example 11: Compression to 10 Atmospheres Plus Chilling to 0° C.

(Not in accordance with the invention).

The CFC-12 laden stream is compressed to 10 atmospheres, then chilled to 0° C. and condensed. The performance is characterized as shown in Table 9.

TABLE 9

| Stream | Composition | Flow rate |
|---|---|---|
| Feed | 50% CFC-12 in air | 100 scfm |
| Liquid condensate | Pure CFC-12 | 4.4 kg/min |
| Non-condensed off-gas from condenser: | 27.2% CFC-12 | 77.3 scfm |

Fractional recovery of CFC from feed: 58%

Example 12: Compression to 10 Atmospheres Plus Chilling to 0° C. Plus Membrane Separation The performance of a process as shown in FIG. 5, involving a condensation step as in Example 11, followed by a membrane separation step, was calculated. In the condensation step, the CFC-12 laden stream is compressed to 10 atmospheres, then chilled to 0° C. The non-condensed fraction from the condensation step is then subjected to a membrane separation step, using a membrane with a selectivity for CFC-12 over nitrogen of 15. A pressure drop across the membrane is provided only by the elevated pressure of the compressed feed. The permeate stream from the membrane separation step is returned for recompression. The performance is characterized as shown in Table 10.

TABLE 10

| Stream | Composition | Flow rate |
|---|---|---|
| Calculated Performance of Diluent Removal Operation as in FIG. 5 | | |
| CONDENSATION STEP: | | |
| Feed | 50% CFC-12 in input + 55.7% returned from membrane step = 51.8% | 100 scfm + 44.3 scfm returned from membrane step = 144.3 scfm |
| Liquid condensate | Pure CFC-12 | 7.4 kg/min |
| Condenser off-gas | 27.2% CFC-12 | 95.4 scfm |
| MEMBRANE SEPARATION STEP: | | |
| Feed | 27.2% CFC-12 | 95.4 scfm |
| Residue | 2.72% CFC-12 | 51.4 scfm |

TABLE 10-continued

| Stream | Calculated Performance of Diluent Removal Operation as in FIG. 5 | |
|---|---|---|
|  | Composition | Flow rate |
| Permeate | 55.7% CFC-12 | 44.3 scfm |

Membrane area: 16.4 m$^2$
Fractional recovery of CFC from feed: 97%

Comparing this example with Example 11, the CFC-12 recovery has improved from 58% to 97%.

Example 13: Compression to 10 Atmospheres Plus Chilling to −20° C.

(Not in accordance with the invention).

The CFC-12 laden stream is compressed to 10 atmospheres, then chilled to −20° C. and condensed. The performance is characterized as shown in Table 11.

TABLE 11

| Stream | Composition | Flow rate |
|---|---|---|
| Feed | 50% CFC-12 in air | 100 scfm |
| Liquid condensate | Pure CFC-12 | 6.2 kg/min |
| Non-condensed off-gas from condenser: | 14.5% CFC-12 | 65.2 scfm |

Fractional recovery of CFC from feed: 81%

Example 14: Compression to 10 atmospheres plus chilling to −20° C., Plus Membrane Separation The performance of a process as shown in FIG. 5, involving a condensation step as in Example 13, followed by a membrane separation step, was calculated. In the condensation step, the CFC-12 laden stream is compressed to 10 atmospheres, then chilled to −20° C. The non-condensed fraction from the condensation step is then subjected to a membrane separation step, using a membrane with a selectivity for CFC-12 over nitrogen of 20. A pressure drop across the membrane is provided only by the elevated pressure of the compressed feed. The permeate stream from the membrane separation step is returned for recompression. The performance is characterized as shown in Table 12.

TABLE 12

| Stream | Calculated Performance of Diluent Removal Operation as in FIG. 5 | |
|---|---|---|
|  | Composition | Flow rate |
| CONDENSATION STEP: | | |
| Feed | 50% CFC-12 in input + 38.3% returned from membrane step = 47.4% | 100 scfm + 27.8 scfm returned from membrane step = 127.8 scfm |
| Liquid condensate | Pure CFC-12 | 7.5 kg/min |
| Condenser off-gas | 14.5% CFC-12 | 78.4 scfm |
| MEMBRANE SEPARATION STEP: | | |
| Feed | 14.5% CFC-12 | 78.4 scfm |
| Residue | 1.45% CFC-12 | 50.7 scfm |
| Permeate | 38.3% CFC-12 | 27.8 scfm |

Membrane area: 13.7 m$^2$
Fractional recovery of CFC from feed: 98.5%

Comparing this example with Example 13, the CFC-12 recovery has improved from 81% to 98.5%.

Example 15: Membrane Separation Alone

The performance of a process involving a membrane separation step alone was calculated. The feed stream was assumed to contain 50% CFC-12 in air and to have a flow rate of 100 scfm. The pressure difference across the membrane was achieved by slight pressurization of the feed to 30 psig, and maintaining the permeate pressure at 10 cmHg by means of a vacuum pump. The performance is characterized as shown in Table 13.

TABLE 13

| Stream | Composition | Flow rate |
|---|---|---|
| Feed | 50% CFC-12 | 100 scfm |
| Residue | 5% CFC-12 | 36.3 scfm |
| Permeate | 76% CFC-12 | 63.7 scfm |

Membrane area: 78 m$^2$
Fraction recovery of CFC from feed: 95%

EXAMPLES 16 AND 17: TYPICAL TREATMENT SCHEMES IN ACCORDANCE WITH THE INVENTION

Example 16

The performance of a typical process in accordance with the invention was calculated. The feed gas stream was assumed to be exhaust gas from an industrial sterilizer, using a mixture of ethylene oxide and CFC-12. It was assumed that the sterilizer is purged after use as follows:

1. A vacuum pump is used to withdraw the sterilant gas mixture, thereby lowering the pressure in the sterilization chamber to about 0.3 atmosphere.

2. The withdrawn gas mixture is subjected to a sterilant removal operation comprising absorption of ethylene oxide into an aqueous solution of sulfuric acid, and reaction of the ethylene oxide to form ethylene glycol. The off-gas stream from the ethylene oxide scrubber/reactor comprises a mixture of 73% CFC-12 and air, and has a flow rate of 200 scfm. The off-gas stream passes to a diluent removal operation, involving both a condensation step and a membrane separation step. The condensation step precedes the membrane separation step, and involves pressurizing the gas stream to 10 atmospheres, then chilling it to about −25° C. The chiller capacity was extrapolated from product literature provided by Filtrine Manufacturing Company, of Harrisville, N.H. The capacities of the compressors were obtained or extrapolated from performance specification charts and other data from the manufacturers. Energy calculations were done by calculating the adiabatic ideal work of compression and dividing by the efficiency of the unit. Compressor efficiency was taken to be 60%. The membrane calculations are all based on a selectivity of 15 for CFC-12 over nitrogen, a conservative value based on the selectivities determined at different temperatures in single-module experiments of a similar type to those described in the first group of examples. The calculations were performed using a computer program based on the gas permeation equations for cross flow conditions described by Shindo et al., "Calculation Methods for Multicomponent Gas Separation by Permeation," *Sep. Sci. Technol.* 20, 445–459 (1985). The membrane area required was generated by the computer program, and was determined to be 50 m$^2$.

3. Air is let in to the sterilization chamber and a second withdrawal/treatment cycle is performed.

4. Altogether six evacuation/treatment cycles are performed, each lasting about 30 minutes. The gas mixtures withdrawn from successive flushing/evacuation cycles contain progressively lower concentrations of CFC-12.

The results are summarized in Table 14. The columns headed A show the CFC-12 concentration in the off-gas stream from the sterilant removal operation after each evacuation cycle. If no diluent removal operation were performed, the total amount of CFC emission after six evacuation cycles would be 8,232 ft³, or about 2771 lb. The columns headed B show the CFC-12 concentration in the emissions from each cycle after treatment by the condensation step alone. In the first three evacuation cycles, CFC-12 can be condensed and recovered. By the fourth cycle, the CFC-12 concentration has dropped too low for recovery by condensation. The net result is a recovery of just over 75% of the CFC-12, and emission of 2,031 ft³, or about 684 lb of CFC. The columns headed C show the CFC-12 concentration in the emissions from each cycle after treatment by the condensation step followed by the membrane separation step. CFC-12 removal is now attainable even in the sixth evacuation cycle. A total CFC recovery close to 95% is achieved, and CFC-12 emissions are reduced to 446 ft³, or 150 lb.

This is a typical, representative calculation. With other operating temperatures, pressures or membrane selectivity, systems that achieve recovery rates from 75% to 99+% could be designed in a similar way.

that the feed, C, to membrane unit 58, is the sum of streams B and J. Residue stream, D, substantially depleted in CFC-12 content compared with the feed, is returned to the sterilizer chamber. Thus instead of the six "batch-mode" cycles of Example 16, purging is accomplished by continuous recycle of the CFC-depleted residue from the membrane separation step. The process continues until no useful rate of CFC-12 retrieval from the condensation step is possible. At this point, the concentration of CFC-12 in stream D has dropped to about 1.5% and stream D is discharged.

Computer calculations of the concentrations and flow rates of the various streams were performed as in Example 16. It was assumed that, initially, stream B has a CFC-12 concentration of 70% and a flow rate of 100 scfm. When stream B is combined with stream J, this means that the feed stream C, to the first membrane unit, has a slightly higher concentration of 71%. Calculations were repeated based on "snapshot" views of the system at times when the concentration of stream C has fallen to 30%, 10%, 5% and finally 2%. The results are summarized in Table 15. The system will recover CFC-12 until the concentration of stream G has fallen to a

TABLE 14

| | CFC-12 Loss for Three Treatment Options | | | | | | | | |
|---|---|---|---|---|---|---|---|---|---|
| | A | | | B | | | C | | |
| | Flow (cfm) | CFC conc. (%) | CFC loss* (ft³) | Flow (cfm) | CFC conc. (%) | CFC loss* (ft³) | Flow (cfm) | CFC conc. (%) | CFC loss* (ft³) |
| Post-Evac. Cycle # | | | | | | | | | |
| 1 | 200 | 73 | 4,380 | 61 | 11 | 200 | 54 | <0.1 | 2 |
| 2 | 200 | 37 | 2,220 | 142 | 11 | 469 | 130 | 0.8 | 31 |
| 3 | 200 | 15 | 900 | 191 | 11 | 630 | 154 | 1.7 | 79 |
| 4 | 200 | 7 | 420 | 200 | 7 | 420 | 190 | 2 | 114 |
| 5 | 200 | 3.5 | 210 | 200 | 3.5 | 210 | 197 | 2 | 118 |
| 6 | 200 | 1.7 | 102 | 200 | 1.7 | 102 | 200 | 1.7 | 102 |
| TOTAL CFC-12 LOSS | | | 8,232 ft³ | * | | 2,031 ft³ | | | 446 ft³ |
| CFC-12 RECOVERY | | 0 | | | 6,201 ft³ | | | 7,786 ft³ | |
| | | 0 | | | 75.3% recovery | | | 94.6% recovery | |
| | | 0 | | | 2,085 ob CFC-12 | | | 2,619 lb CFC-12 | |

*CFC is the volume (ft³) of pure CFC-12 lost in a 30 minute evacuation cycle.
For example, 200 cfm × 73% × 30 min = 4,380 ft³

Example 17

Figure 9:
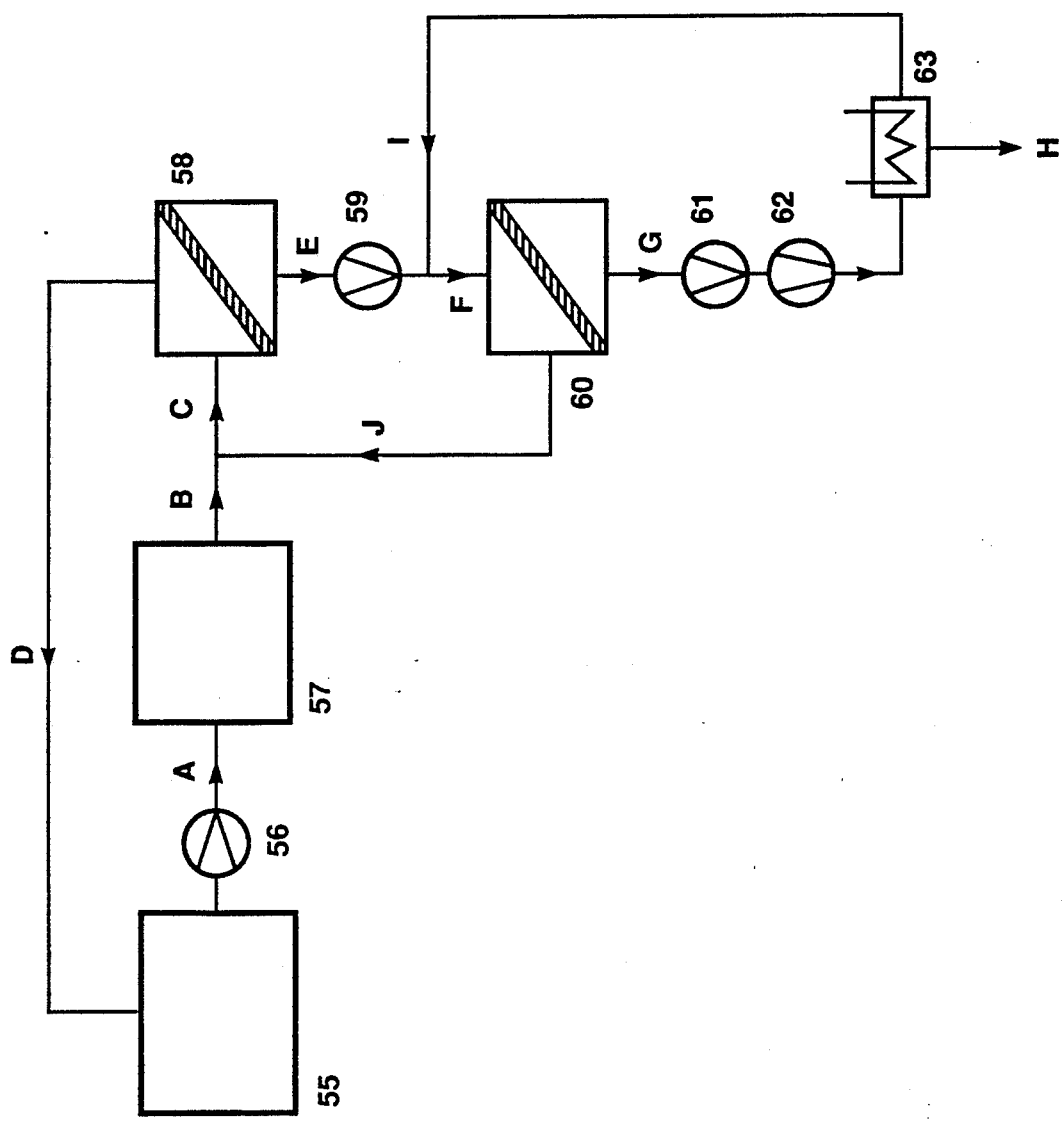
FIG. 9 is a schematic drawing of a process for reducing emissions from industrial sterilizers, including a sterilant removal operation and a diluent removal operation comprising a two-stage membrane separation step and a condensation step.
Figure 10:
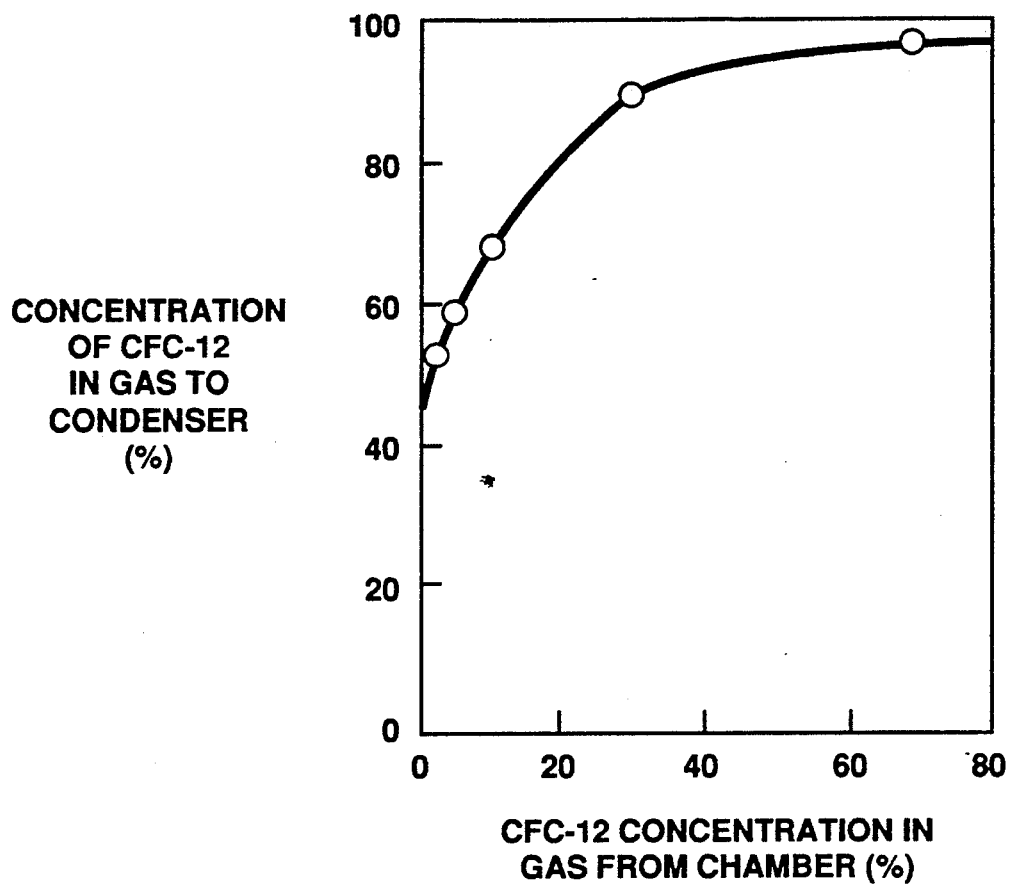
FIG. 10 is a graph of CFC-12 concentration in the second stage permeate as a function of CFC-12 concentration in the feed to a two-stage membrane separation step.

The assumptions of Example 16 were used to perform a second representative calculation. In this case, the purge process was performed by continuously recycling the residue from the membrane separation step to the sterilizer chamber, instead of carrying out six discrete evacuation/treatment steps. FIG. 9 is a schematic of the process. Referring now to this figure, sterilant gas mixture stream, A, is withdrawn from sterilizer chamber, 55, by means of vacuum pump, 56. The gas stream passes to absorption unit, 57, for removal of ethylene oxide. Stream B, containing a mixture of CFC-12 in air, passes to first membrane separation unit, 58. The first permeate stream, E, enriched in CFC-12 compared with the feed, is withdrawn through vacuum pump, 59, and passes to second membrane separation unit, 60. The second permeate stream, G, further enriched in CFC-12, is withdrawn through vacuum pump, 61, and passed to a condensation step which consists of compression to 10 atmospheres in compressor, 62, followed by cooling to 0° C. in chiller, 63. Stream, H, withdrawn from the condensation step contains liquid CFC-12 and could be processed for reuse. Non-condensed stream, I, from the condensation step is returned and mixed with stream E, so that the feed, F, to membrane unit 60, is the sum of streams E and I. Residue stream, J, from the second membrane unit is returned and mixed with stream B, so point at which the partial pressure of CFC-12 in the stream drops to a value approaching the saturated vapor pressure of CFC-12 at 10 atmospheres and 0° C., which is about 45 psia. Thus the process will stop when the concentration of CFC-12 in stream G falls to about 30%. From a practical point of view, the lowest desirable concentration of stream G at which the process remains useful is about 40–50%. FIG. 10 is a graph of the CFC-12 concentration in stream G as a function of the concentration of stream C. The graph shows that a concentration above 50% can be sustained in stream G, even when the concentration of stream C has dropped to 2%.

Figure 11:
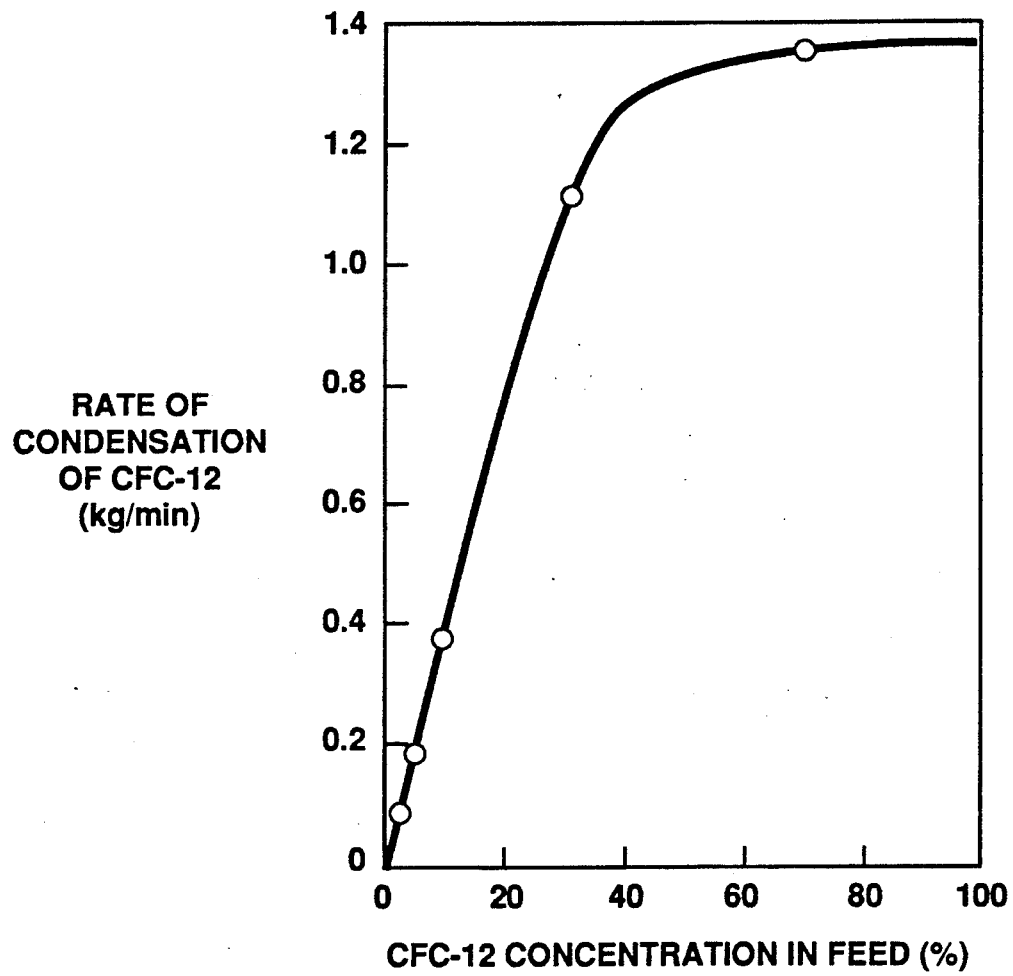
FIG. 11 is a graph of the rate of recovery of liquid CFC-12 from a membrane separation/condensation diluent removal operation as a function of the CFC-12 concentration in the feed to a two-stage membrane separation step.

FIG. 11 is a graph of the rate of recovery of CFC-12 in stream H as a function of the concentration of stream C. From the graph it can be estimated that 80% of the CFC-12 contained in a sterilizer chamber of volume 500–1,000 ft³ would be removed by this system within 60 minutes of operation.

TABLE 15

Stream Compositions and Flow Rates for Sterilizer Emissions Treatment Process of FIG. 9, Based on Computer Calculations

| B | C | D | E | F | G | H | I | J |
|---|---|---|---|---|---|---|---|---|
| Composition (% CFC-12) | | | | | | | | |

TABLE 15-continued

Stream Compositions and Flow Rates for Sterilizer
Emissions Treatment Process of FIG. 9,
Based on Computer Calculations

| B | C | D | E | F | G | H | I | J |
|---|---|---|---|---|---|---|---|---|
| 70 | 71 | 61 | 94.7 | 92 | 98.5 | — | 50 | 79.7 |
| 31 | 30 | 23.6 | 75.8 | 70 | 90.6 | — | 50 | 24.9 |
| 10.2 | 10 | 7.5 | 41 | 44 | 69.1 | — | 50 | 4.25 |
| 5.1 | 5 | 3.8 | 23.7 | 35 | 59.7 | — | 50 | 3.8 |
| 1.9 | 2 | 1.5 | 10.5 | 28 | 54 | — | 50 | 3.2 |
| Flow Rate (scfm except H, which is kg/min) ||||||||| 
| 100 | 110 | 75 | 35 | 36 | 25 | 1.4 | 0.5 | 10 |
| 100 | 106 | 91 | 15 | 19 | 13 | 1.1 | 4 | 6 |
| 100 | 104 | 96 | 8 | 12 | 8 | 0.4 | 4 | 4 |
| 100 | 104 | 98 | 6 | 10 | 6 | 0.2 | 4 | 4 |
| 100 | 104 | 99 | 5 | 9 | 5 | 0.07 | 4 | 4 |

We claim:

1. A process for treating a gas mixture including a sterilant gas and a diluent gas, comprising:
   (a) feeding said gas mixture to a first separation process to substantially remove said sterilant from said gas mixture;
   (b) withdrawing a treated gas stream from said first separation process;
   (c) feeding said treated gas stream to a second separation process, comprising passing at least a portion of said treated gas stream through a membrane separation unit containing a permselective membrane;
   (d) withdrawing from said separation unit a first stream enriched in said diluent gas compared with said gas mixture;
   (e) withdrawing from said membrane separation process a second stream depleted in said diluent gas compared with said gas mixture.

2. The process of claim 1, wherein said first separation process is a scrubbing process.

3. The process of claim 1, wherein said first separation process is an oxidation process.

4. The process of claim 1, wherein said first separation process is an ion-exchange process.

5. The process of claim 1, wherein said first separation process is a condensation process.

6. The process of claim 1, wherein said first stream is a permeate stream from said membrane separation unit.

7. The process of claim 1, wherein said first stream is a residue stream from said membrane separation unit.

8. The process of claim 1, wherein said permselective membrane comprises a multilayer membrane.

9. The process of claim 1, wherein said permselective membrane comprises a rubbery polymer.

10. The process of claim 1, wherein said permselective membrane comprises silicone rubber.

11. The process of claim 1, wherein said gas mixture includes nitrogen and wherein said permselective membrane has a diluent gas/nitrogen selectivity not less than 5.

12. The process of claim 1, wherein said diluent gas comprises a fluorinated hydrocarbon.

13. The process of claim 1, wherein said diluent gas is CFC-12.

14. The process of claim 1, wherein said sterilant gas is ethylene oxide or propylene oxide.

15. The process of claim 1, wherein at least 85% of said diluent gas component is removed from said treated gas stream.

16. The process of claim 1, wherein at least 90% of said diluent gas component is removed from said treated gas stream.

17. A process for treating a gas mixture including a sterilant gas and a diluent gas, comprising:
   (a) feeding said gas mixture to a first separation process to substantially remove said sterilant from said gas mixture;
   (b) withdrawing a treated gas stream from said first separation process;
   (c) feeding said treated gas stream to a second separation process, comprising a condensation step and a membrane separation step, said condensation step comprising bringing said treated gas stream to a condition characterized in that the concentration of said diluent gas is greater than its saturation concentration at said condition, so that a portion of said diluent gas condenses from said treated gas stream; and said membrane separation step comprising:
   (a) passing at least a portion of said treated gas stream through a membrane separation unit containing a permselective membrane;
   (b) withdrawing from said separation unit a first stream enriched in said diluent gas compared with said gas mixture;
   (c) withdrawing from said membrane separation process a second stream depleted in said diluent gas compared with said gas mixture.

18. The process of claim 17, wherein said condensation step precedes said membrane separation step.

19. The process of claim 17, wherein said condensation step follows said membrane separation step.

20. The process of claim 17, wherein said condensation step includes a compression step to raise the pressure of said treated gas stream and a chilling step to lower the temperature of said treated gas stream.

21. The process of claim 17, wherein said first separation process is a scrubbing process.

22. The process of claim 17, wherein said first separation process is an oxidation process.

23. The process of claim 17, wherein said first separation process is an ionexchange process.

24. The process of claim 17, wherein said first separation process is a condensation process.

25. The process of claim 17, wherein said first stream is a permeate stream from said membrane separation unit.

26. The process of claim 17, wherein said first stream is a residue stream from said membrane separation unit.

27. The process of claim 17, wherein said permselective membrane comprises a multilayer membrane.

28. The process of claim 17, wherein said permselective membrane comprises a rubbery polymer.

29. The process of claim 17, wherein said permselective membrane comprises silicone rubber.

30. The process of claim 17, wherein said gas mixture includes nitrogen and wherein said permselective membrane has a diluent gas/nitrogen selectivity not less than 5.

31. The process of claim 17, wherein said diluent gas comprises a fluorinated hydrocarbon.

32. The process of claim 17, wherein said diluent gas is CFC-12.

33. The process of claim 17, wherein said sterilant gas is ethylene oxide or propylene oxide.

34. The process of claim 17, wherein at least 85% of said diluent gas component is removed from said treated gas stream.

35. The process of claim 17, wherein at least 90% of said diluent gas component is removed from said treated gas stream.

36. The process of claim 17, wherein said compression step does not raise the pressure of said incoming gas stream above 15 atmospheres.

* * * * *